United States Patent [19]

Broad

[11] 4,102,788
[45] Jul. 25, 1978

[54] PLATE FILTER PRESSES

[75] Inventor: Bernard Henry Broad, Cornwall, England

[73] Assignee: English Clays Lovering Pochin & Company Limited, St. Austell, England

[21] Appl. No.: 728,290

[22] Filed: Sep. 30, 1976

Related U.S. Application Data

[63] Continuation of Ser. No. 433,703, Jan. 16, 1974, abandoned.

[30] Foreign Application Priority Data

Jan. 16, 1973 [GB] United Kingdom ............... 2329/73

[51] Int. Cl.² .................... B01D 25/32; B30B 9/04
[52] U.S. Cl. ................................. 210/230; 100/115;
100/198; 104/162; 254/93 R; 105/150
[58] Field of Search ........................... 100/113–115,
100/126–128, 194–198; 104/93, 112; 105/150;
210/225, 230, 231, 236; 254/93 R, 84, 87

[56] References Cited

U.S. PATENT DOCUMENTS

| 865,113 | 9/1907 | Louden | 105/150 |
| 3,224,381 | 12/1965 | Stewart | 105/150 |
| 3,446,358 | 5/1969 | Kratochvil et al. | 210/230 |

*Primary Examiner*—Peter Feldman
*Attorney, Agent, or Firm*—Larson, Taylor and Hinds

[57] ABSTRACT

There is disclosed an apparatus suitable for shifting the plates of a plate filter press. The apparatus comprises supporting means for supporting the apparatus so that it can be moved longitudinally of the plate filter press, and a manually-operable, power-drivable device including first and second members capable of engaging plates of the plate filter press and movable relative to one another by a source of power along a line of action which, when the apparatus is in use is parallel to, or substantially parallel to, the plate filter press. The arrangement is such that, in use, the device can be rotated or swung in order to bring the first and second members into and out of engagement with plates of the plate filter press and, when in engagement with plates of the plate filter press, the device can be operated to cause movement of the first and second members relative to one another and hence movement of one or more plates of the plate filter press.

6 Claims, 6 Drawing Figures

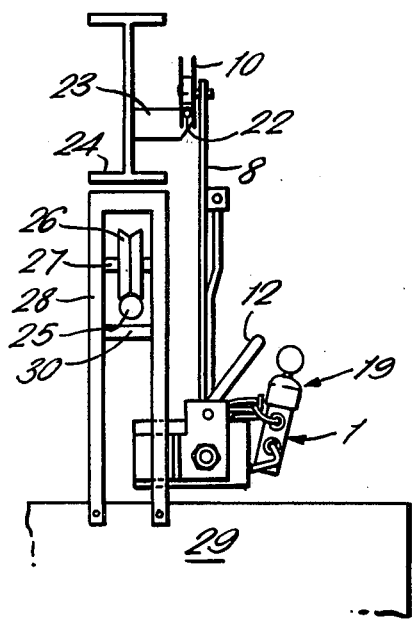
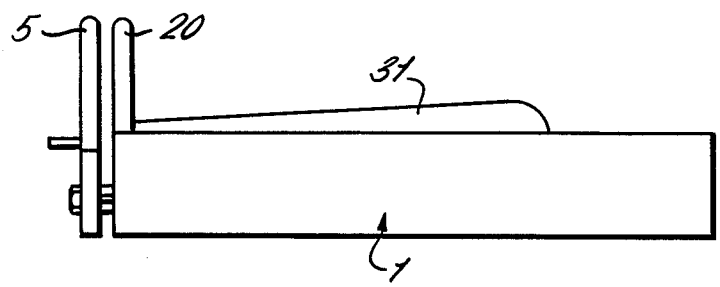

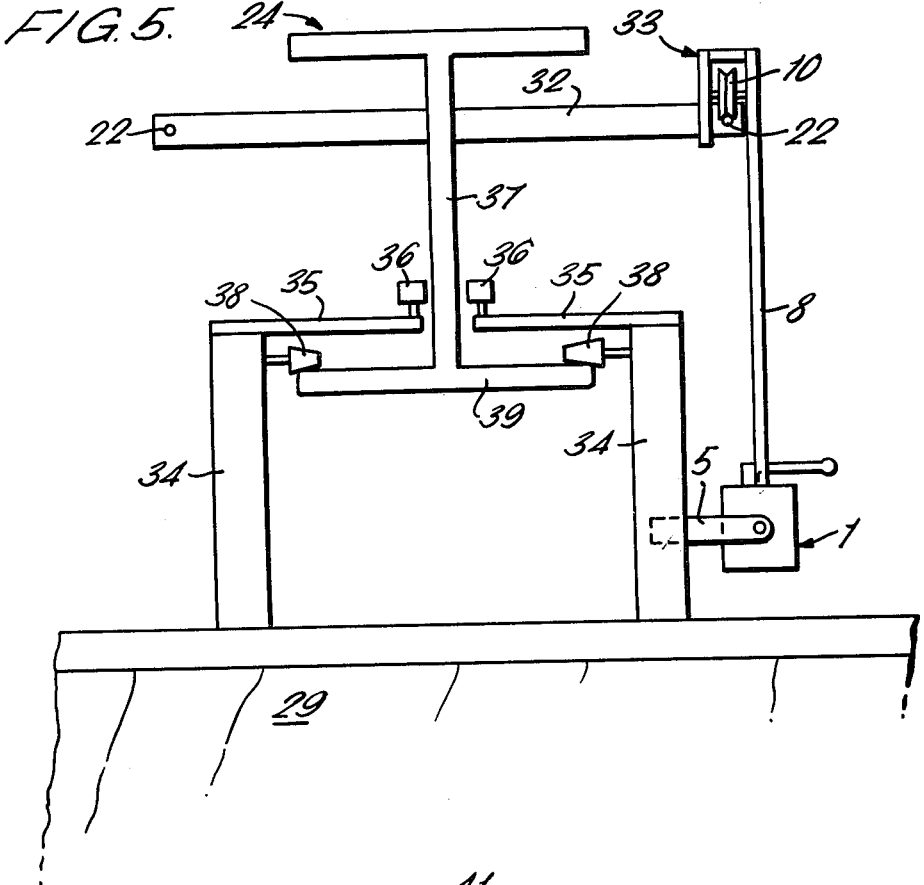
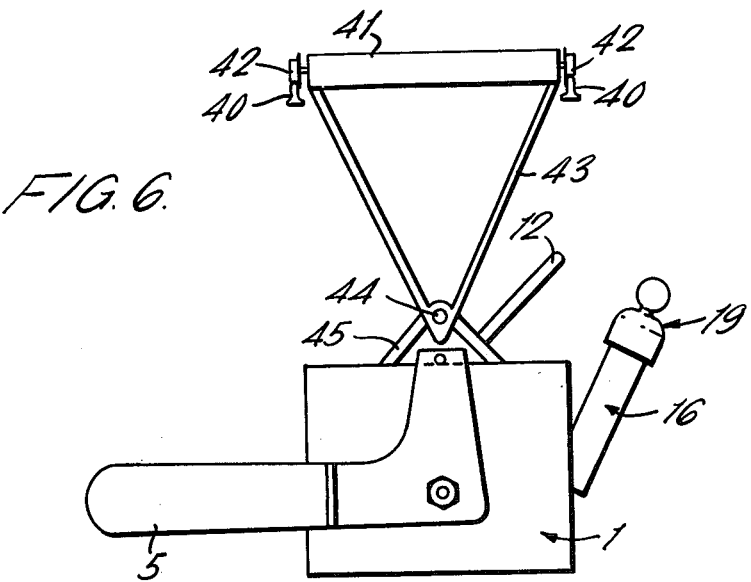

PLATE FILTER PRESSES

This is a continuation, of application Ser. No. 433,703 filed Jan. 16, 1974, now abandoned.

BACKGROUND OF THE INVENTION

This invention relates to plate filter presses and more particularly is concerned with apparatus suitable for shifting the plates of a plate filter press.

Plate filter presses comprise a plurality of filter plates slidably carried by a suitable carrier member; for instance, the filter plates may be either slidably mounted on a carriageway arranged alongside the filter press or slidably suspended from a carrier member arranged above the filter press.

Filter presses generally comprise a battery of up to 100 or more filter plates.

In one well known type of plate filter press, each filter plate is recessed on its faces, and each adjacent pair of filter plates defines a filter-pressing cavity. This type of plate filter press is generally known as the 'recessed plate' type.

In another well known type of plate filter press, a plurality of filter plates alternate with a plurality of frames; the frames define the edges of the filter-pressing cavities while the plates, when in position, define the sides of the cavities. This type of plate filter press is generally known as the 'plate and frame' type or as the 'flush-plate' type.

In order to effect filtering, the plates are compressed, generally by a horizontally-mounted, hydraulic ram, with the plates contacting each other or their associated frames in a sealable manner, and with the material to be filtered present in slurry form in each filter-pressing cavity. When the filtering operation is complete, the hydraulic ram pressure is released, after which it is necessary to separate the plates or plates and frames and to dislodge the filtered material from each filter-pressing cavity; the dislodged filter material conveniently falls onto a conveyor belt mounted under the filter press.

Further details regarding the construction and operation of plate filter presses can be found, for example, in Chapter 19 of the 5th Edition of the Chemical Engineer's Handbook by Robert H. Perry and Cecil H. Chilton published in 1973 by McGraw-Hill Inc.

The separation of the filter plates, each of which can weigh up to 100 lbs or more, may be preformed either manually, for example by two men, one on each side of the press, each using a crowbar to lever the plates apart, or automatically by complicated and expensive equipment which is an integral part of the ancillary equipment of each filter press and which is generally hydraulically or pneumatically operated. A disadvantage of this type of automatic equipment is that, although the plate separation operation is performed by a machine, operators are still necessary to assist in the manual dislodging of the filtered material from each cavity; and it will be appreciated that, once an automatic plate separation sequence is initiated, any delay in dislodging the filtered material from the cavity puty the operator(s) at risk in view of the possibility of an arm or hand being trapped by the next plate in the sequence as it is automatically moved along. Sophisticated photocell-initiated safeguard systems are known for obviating or reducing this risk to the operator, but such systems inevitably increase the cost of the equipment.

It is therefore an object of the present invention to provide a plate-separation device which is power-drivable but is manually-operable.

SUMMARY OF THE INVENTION

According to the present invention, there is provided an apparatus suitable for shifting the plates of a plate filter press, which apparatus comprises supporting means for supporting the apparatus in a manner such that the apparatus can be moved longditudinally of the plate filter press, and a manually-operable, power-drivable device including first and second members capable of engaging plates of the plate filter press and movable relative to one another by a source of power along a line of action which, when the apparatus is in use, is parallel to, or substantially parallel to, the plate filter press, the arrangement being such that, in use, the device can be rotated or swung in order to bring the first and second members into and out of engagement with plates of the plate filter press and, when in engagement with plates of the plate filter press, the device can be operated to cause movement of the first and second members relative to one another and hence movement of one or more plates of the plate filter press.

For convenience, the present invention will be described with reference to a plate filter press of the recessed plate type, although it will be appreciated that the invention is also applicable to the shifting of frames and plates in a plate filter press of the plate and frame type.

DESCRIPTION OF THE PREFERRED EMBODIMENTS

Advantageously, the supporting means are constructed so as to enable the apparatus to be supported on or from an elongate support in a manner such that the apparatus can be moved along the elongate support. With this arrangement the first and second members of the manually-operable power-drivable device are movable relative to one another along a line of action which, when the apparatus is supported on or from the elongate support, is parallel to, or substantially parallel to, the elongate support.

In one embodiment of the present invention the device is at least partly rotatable relative to the supporting means, preferably about an axis parallel or substantially parallel to the line of action, whereby, in use of the apparatus, the first and second members can be brought into and out of engagement with the plates. In an alternative embodiment the arrangement of the apparatus is such that, in use, the apparatus is at least partly rotatable about the elongate support, for example, whereby the device can be swung relative to the elongate support to bring the first and second members into and out of engagement with the plates.

Conveniently, the device includes a piston and cylinder arrangement with the first member being carried by the piston and the second member being carried by the cylinder.

The piston and cylinder arrangement is advantageously such that power can be applied to the piston in order to propel the piston into the cylinder or out of the cylinder.

Preferably the device of the apparatus of the present invention is drivable by a source of fluid under pressure, advantageously compressed air. The device should include a control mechanism for controlling the distribution of fluid under pressure so as to ensure that the first and second members approach, or move away from, each other as desired at the desired speed and over the desired distance.

The first and second members are preferably in the form of parallel or substantially parallel lugs disposed perpendicularly or substantially perpendicularly to the line of action.

The device in the apparatus according to the present invention is preferably constructed so as to be operable with one hand only; and in this way the other hand of an operator is free to dislodge the filtered material from the cavity. In practice, the operator need only manipulate the apparatus into position (as explained in more detail hereinbelow) and initiate the operation of the device, all the power required to separate the plates being supplied through the device itself.

The apparatus of the present invention if preferably readily detachable from an elongate support member arranged alongside or above one plate filter press, thereby enabling one apparatus to be used for several filter presses. In other words the supporting means of the apparatus is preferably of a type such that it allows the apparatus to be readily transferred from one elongate support associated with one plate filter press to another elongate support member associated with another plate filter press.

In one embodiment of the present invention, the supporting means of the apparatus comprises a plurality, generally a pair, of wheels provided around their circumference with a V- or U-shaped groove; these wheels should be designed so that they can suitably engage a tensioned slide-wire or other elongate support running parallel to one side of the filter press and to said line of action, which slide-wire or other elongate support is preferably mounted on the frame of the filter press. In the case of a plate filter press in which the filter plates (and frames, when present) are suspended from an overhead carrier member, the tensioned slide-wire or other elongate support, which is mounted parallel to the carrier member, is preferably above the filter plates; the positioning of the tensioned slide-wire or other elongate support should be such that when the apparatus hangs naturally from, or is otherwise naturally supported on, the slide-wire or elongate support member, the first and second members of the device are positioned between extension members of adjacent plates or two upwardly extending connecting members (between each plate and the overhead carrier) of adjacent plates.

Similarly, when the plates are slidably mounted on a carriageway arranged alongside the filter press, for example by being carried on a pair of parallel tracks by means of lateral extensions of the plates which run along the tracks, the elongate support should be so positioned as to ensure that the first and second members can be positioned between pairs of suitable engagement regions of the plates.

The device of the apparatus according to the present invention is preferably provided with a grip bar or handle and, desirably, there is conveniently located adjacent to the handle or grip bar a lever or other control for directing and controlling the supply of compressed air (or other fluid under pressure) to, for example, the piston and cylinder arrangement.

When compressed air is used as the fluid under pressure, it can be fed to a control valve mounted on the cylinder of the piston and cylinder arrangement by a flexible air supply line slidably hung from the slide-wire or other elongate support, via a suitable snap connector provided on the apparatus.

In the operation of a preferred embodiment of the apparatus of the present invention, when filtering is complete and the filter plates are to be separated, the apparatus is mounted on the slide-wire or other suitable elongate support. The piston is as fully retracted as possible, so that the lugs are close together. The lugs are then inserted between two engagement regions (which can be in the form of extension members) of adjacent plates or between two upwardly directed connecting members (leading to an overhead carrier member) of adjacent plates, and a control lever is operated to feed compressed air to the cylinder of a piston and cylinder arrangement in a manner such that the piston and one lug move outwardly, thereby forcing one movable plate away from the remainder of the plurality of plates. The most distant plate in this remaining plurality of plates will be hard up against a rigid member, hence preventing movement of the plate adjacent to the plate to be moved. As soon as the first plate has been sufficiently separated from the remaining plurality of plates, the filtered material is dislodged manually, the piston retracted so that the lugs no longer engage the plate engagement regions or connecting members, the apparatus then swung outwardly away from the press and moved into cooperative alignment with the next pair of plates, and the lugs (now again close to each other) inserted between the next pair of plate extension members or connecting members, so that the operation may be repeated.

If it is desired to move several plates at once, for example when returning the plates to their original positions, this can be effected by engaging the lugs against the appropriate plate engagement regions or plate connecting members.

If shifting plates of a press in which the plates are carried by parallel tracks one at each side of the plates, it may be necessary to employ one apparatus on each side of the press so as to ensure reasonably free movement of the plates along the tracks.

An alternative arrangement of the supporting means and the device is one in which the supporting means is a trolley adapted to run for example, along a monorail or a two-rail track, parallel to the length of the filter press, and the device is rotatably mounted on a frame carried by the supporting means in a manner such that it can at least partly rotate about an axis on or parallel to the line of action. The frame can be mounted on or slung from the trolley.

For a better understanding of the present invention and to show how the same may be carried into effect, reference will now be made, by way of example, to the accompanying drawings in which:

FIG. 3 is a view towards one end of the apparatus of FIG. 1 in operation with a conventional plate filter press;

FIG. 4 is a view from above of part of the apparatus of FIG. 1;

FIG. 5 is a view towards the left-hand end of the apparatus of FIG. 1 in operation with a conventional plate filter press which is a modification of that shown in FIG. 3; and FIG. 6 is a view towards one end of a different embodiment of the apparatus of the present invention, in which the device is slung from a trolley.

Figure 1:
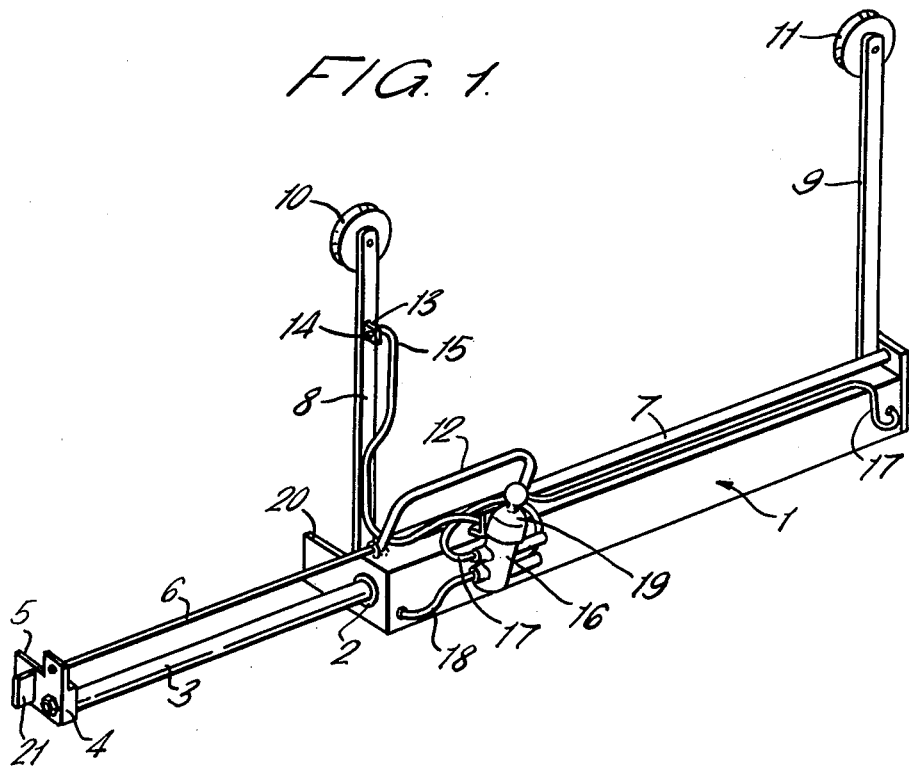
FIG. 1 is an oblique view from above and from one side of an apparatus according to the present invention.
Figure 2:
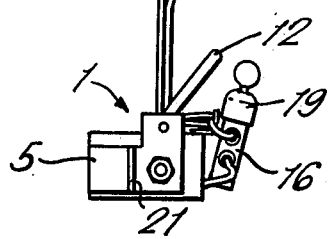
FIG. 2 is a view towards the left-hand of the apparatus shown in FIG. 1.

Referring firstly to FIGS. 1 and 2 of the drawings, there is shown a device generally indicated by the reference numeral 1 which includes a tubular member 2 defining a cylinder in which is partially accommodated a piston 3 to the outward free and region of which is bolted a stop 4 provided with a lug 5 extending perpendicularly to the piston 3 and generally horizontally. Parallel to, and above, the piston 3 is a rod 6 which is accommodatable in and slidable in a tube 7 mounted above the tubular member 2. The function of the rod 6 and tube 7 is to prevent rotation of the piston 3 within the cylinder, and hence to prevent rotation of the lug 5.

Extending upwardly from the device 1 are two stays 8 and 9 at the upper end region of which are wheels 10 and 11 respectively, which wheels 10 and 11 lie in a vertical plane and are mounted so as to be rotatable about an axis perpendicular to the length of the piston 3.

Mounted on the tube 7 is a handle 12 for the operator, the handle 12 being on that side of the stays 8 and 9 opposite to the side on which the lug 5 projects.

Mounted on the stay 8 is a bracket 13 carrying a union 14 communicating with a compressed air inlet pipe 15 leading to a valve unit 16 carried on the nearside of the device 1. Leading from the valve unit 16 are a pipe 17 and a pipe 18. When compressed air (or any other fluid under pressure) is sent through the pipe 17, the piston 3 is moved outwardly in the cylinder (i.e. to the left in FIG. 1), whereas when compressed air is sent through the pipe 18 the piston 3 is retracted into the cylinder (i.e. to the right in FIG. 1). The supply of compressed air from the pipe 15 via the valve unit 16 to the pipe 17 and to the pipe 18 is controlled by a valve control assembly generally indicated by the reference numeral 19 and of conventional construction.

A lug 20 which corresponds in shape to the lug 5 is provided on the left-hand end of the main body of the device 1, in a manner such that, when the piston 3 is retracted as far as is possible into the cylinder, the lug 5 is close to and parallel to the lug 20. A plate 21 mounted on the stop 4 is intended to prevent the lugs 5 and 20 swinging too deeply into gaps between plates of the filter press.

Referring now to FIG. 3 of the accompanying drawings, there is shown an apparatus as described with reference to FIGS. 1 and 2, mounted in position on a conventional plate filter press of the overhead mounting type. In FIG. 3 only the more obvious components of the apparatus of FIGS. 1 and 2 are illustrated, for the sake of clarity. The wheels 10 and 11 (although only wheel 10 is shown) of the apparatus are carried on a tensioned slide-wire 22 which extends between two brackets 23 (only one of which is shown) mounted on and perpendicularly to an elongate beam 24 of H-shaped cross-section, which forms part of a conventional filter press.

Running parallel to and below the beam 24 is a rigid rail 25 mounted on part of the same end frame (not shown) as that which carries the beam 24. Mounted on the rail 25 is a wheel 26 rotatable about an axle 27 carried by an inverted U-shaped bracket 28, the lower end of which bracket is secured to a filter plate 29 only part of which is shown. Although not shown, there is a similar wheel 26, axle 27 and bracket 28 for each plate 29. An additional strengthening member 30 between the two parallel vertical portions of the inverted U-shaped bracket 28 is also provided.

There is, for the sake of clarity, shown only one filter plate of the conventional plate filter press. As mentioned above, in a conventional plate filter press numerous filter plates are carried parallel to each other on a suitable carrier which, in the embodiment shown in FIG. 3, is the rail 25. As can be seen in FIG. 3, the lug 5 of the device is positioned behind one of the vertical parallel legs of the bracket 28. The other lug 20 (not shown in FIG. 3) of the device will be positioned in front of a similar leg of an adjacent bracket (not shown) supporting an adjacent filter plate.

When it is wished to separate adjacent filter plates, the union 14 is connected to a supply of compressed air. The control valve assembly 19 is operated with one hand by the operator in a manner such as to allow compressed air to be fed, at a controlled pressure, along the pipe 17 so as to cause the piston 3 to move out of the cylinder and hence cause the separation of the lugs 5 and 20. The lug 20 is prevented from movement (in the right-hand direction as indicated in FIG. 1) by the remaining filter plates which are pressed up against one end frame of the filter press. The piston 3 and lug 5 are free to move and cause the movement (towards the left in FIG. 1) of the bracket 28 and the filter plate 29 supported by that bracket. When there is sufficient separation between the pair of filter plates, the operator can, with his free hand, dislodge the filter material (not shown) from the cavity originally defined by adjacent filter plates.

As soon as the filtered material has been dislodged from one cavity, the apparatus is swung outwardly towards the operator (to the right in FIG. 3) so that the lugs 5 and 20 are clear of each bracket 28. Either before or after this swinging clear operation, compressed air is sent through the pipe 18 to retract the piston 3 into the cylinder. The whole apparatus, still in the swung clear position, is then moved along the guide-wire 22 until each of the lugs 5 and 20 are opposite the gap between the next pair of brackets 28. The apparatus is then allowed to swing on its guide-wire 22 towards the brackets 28 so that the lugs 5 and 20 adopt the position relative to the bracket 28 shown in FIG. 3. The procedure can then be repeated.

It is, of course, quite possible to move more than one filter plate at any one time, merely by ensuring that the lugs 5 and 20 are accommodated within suitable spaces between the brackets 28 before actuating the valve control assembly 19 so as to direct compressed air through pipe 17 or through pipe 18, depending on whether the operator is separating one batch of plates from another batch or whether the operator is bringing one or more plates towards another plate or towards the frame end. As can be clearly seen in FIG. 3, the device of the present invention can, whenever desired, be removed from one conventional plate filter press merely be lifting the device from its guidewire 22 and if necessary disconnecting the union 14 from the compressed air supply. The device can then be positioned on the guidewire of another press. The wheels 10 and 11 of the device are provided with a U-shaped groove around their circumference so that they fit securely on the guide-wire 22 and can allow the device to rotate freely, albeit through a limited angle, on and about the guide-wire 22.

FIG. 4 shows part of the device of the apparatus shown in FIG. 1. For the sake of clarity, many components have been omitted from FIG. 4; however, there is clearly shown a guard 31 in the form of a wedge, the thin end of which abuts the lug 20 and the thick end of which terminates approximately two thirds of the way along the casing of the cylinder 2. The maximum width (as measured horizontally) of the guard 31 is approximately one-third of that of the casing of the cylinder 2. The purpose of the guard 31 is to protect the casing from damage caused by being knocked against the press plate hanging frame, especially when the device is being used to return a batch of several plates along the press to their original position.

FIG. 5 illustrates an alternative manner in which the filter plates can be suspended from an overhead frame. As in FIG. 3, the main support member is an H-section beam 24, with the H lying on its side. Mounted at each end of the beam 24 is a bracket 32 extending perpendicularly from each side of the beam 24. Provided between the end regions of the brackets 32 and parallel to the beam 24 are two tension support wires 22. On one wire is shown the wheel 10 of an apparatus, carried on an axle mounted in a bracket 33 at the head of the stay 8.

The filter plate 29 is supported by two upright extensions 34 each of which is provided at its upper end with an inwardly directed flange 35. Rollers 36 are mounted on the flanges 35 for engagement with the vertical portion 37 of the beam 24, and rollers 38 are provided on the extensions 34 for engagement with, and support on, the lower horizontal portion 39 of the beam 24.

Instead of suspending the apparatus from a tensioned guide-wire, the apparatus can be carried on a rail or plurality of rails, always provided that the device or whole apparatus can be rotated to allow engagement and disengagement of the first and second members, and the plates.

Such an alternative arrangement is illustrated in FIG. 6 in which the device 1 is shown in over-simplified form for the sake of clarity. Provided alongside the filter press (unshown) is a pair of parallel rails 40 which carry a trolley 41 provided with four wheels 42 (only two of which are shown) positioned on the rails 40. Suspended from both ends of the trolley 41 are frames 43 carrying an axle 44 on which are mounted in rotational relationship frames 45 which carry the device 1. The arrangement is such that the device 1, when hanging naturally, has its lugs 5 and 20 in operative position between engagement regions of the filter plates. The device 1 and lugs 5 and 20 can be swung out of the engaging position by pushing or pulling the handle 12.

The trolley 41 can be removed from the rails 40 by raising the trolley, tilting the same and lowering it between the rails 40.

Instead of having the device 1 rotatably slung below the trolley 41, it could be rotatably mounted on the trolley 41. Although the trolley 41 is shown as being carried on two rails 40, it could equally satisfactorily be carried on a monorail.

When the filter plates are mounted on a carriageway provided at each side of the filter plates, a trolley can be provided on a track above the filter plates and two devices can be carried by the one trolley, one on each side of the press.

In order to be able to use the apparatus of the present invention only requires minimal modification of existing plate filter presses.

What is claimed is:
1. An apparatus suitable for shifting the plates of a plate filter press, which apparatus comprises:
(a) a manually-operable, power-drivable device which includes (i) a piston and cylinder arrangement in which the piston is reciprocatable under power along a line of action within the cylinder, and (ii) first and second members capable of engaging plates of a plate filter press, the first member being rigidly mounted on a rod of the piston and the second member being rigidly mounted on the cylinder, and the first and second members being disposed perpendicularly or substantially perpendicularly to the line of action; and
(b) supporting means for supporting the device from an elongate support, the supporting means comprising (i) a plurality of wheels each having a groove around its periphery, for mounting on an elongate support, and (ii) means for holding the wheels in spaced relationship from the device whereby, in use, the device can hang below the elongate support and the apparatus can be pivoted around the elongate support;
the arrangement of the apparatus being such that, in use of the apparatus and with the supporting means supported from the elongate support disposed parallel to a plate filter press, the apparatus can be pivoted with respect to the elongate support to bring the first and second members into and out of engagement with plates of the plate filter press and, when so in engagement, the device can be operated to cause movement of the piston and first member relative to the cylinder and second member and hence movement of one or more plates of the plate filter press; and the arrangement of the supporting means being such that the supporting means is readily detachable from an elongate support, whereby the apparatus may be readily transferred to an elongate support associated with another plate filter press.

2. An apparatus according to claim 1, wherein the device includes a control mechanism for selectively directing a fluid under pressure to opposite ends of the piston to cause movement of the piston relative to the cylinder, in opposite directions.

3. An apparatus according to claim 1, which also includes means for preventing the piston from rotating about its own axis within the cylinder.

4. An apparatus according to claim 1, which also includes (a) a handle mounted on the device on that side of the latter remote from the first and second members, to assist in pivoting the apparatus about a single elongate support, and (b) a guard mounted on the device to prevent the cylinder from contacting the plates of a plate filter press.

5. In combination, an elongate support and an apparatus according to claim 1, the supporting means of the apparatus being supported by the elongate support with the wheels resting on the elongate support.

6. In combination, (i) a plate filter press, (ii) an elongate support disposed parallel to the plate filter press, and (iii) an apparatus according to claim 1 supported by the elongate support, the device being connected to a supply of fluid under pressure.

* * * * *